US012755520B2

(12) United States Patent
Vaswani et al.

(10) Patent No.: US 12,755,520 B2
(45) Date of Patent: Oct. 6, 2026

(54) LOCAL SELF-ATTENTION COMPUTER VISION NEURAL NETWORKS

(71) Applicant: Google LLC, Mountain View, CA (US)

(72) Inventors: Ashish Teku Vaswani, San Francisco, CA (US); Prajit Ramachandran, Santa Clara, CA (US); Aravind Srinivas Lakshminarayanan, Berkeley, CA (US); Blake Alan Hechtman, Mountain View, CA (US); Niki J. Parmar, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 1149 days.

(21) Appl. No.: 17/347,416

(22) Filed: Jun. 14, 2021

(65) Prior Publication Data

US 2021/0390410 A1 Dec. 16, 2021

Related U.S. Application Data

(60) Provisional application No. 63/038,718, filed on Jun. 12, 2020.

(51) Int. Cl.
*G06V 10/82* (2022.01)
*G06F 18/21* (2023.01)
*G06N 3/08* (2023.01)
*G06V 10/44* (2022.01)

(52) U.S. Cl.
CPC .......... *G06V 10/82* (2022.01); *G06F 18/2163* (2023.01); *G06N 3/08* (2013.01); *G06V 10/454* (2022.01)

(58) Field of Classification Search
CPC .......... G06N 3/08; G06N 3/045; G06N 3/082; G06N 3/088; G06N 3/0895; G06N 3/09; G06N 3/091; G06N 3/092; G06N 3/094; G06N 3/096; G06N 3/098; G06N 3/0985; G06F 18/2163; G06V 10/454; G06V 10/82
See application file for complete search history.

(56) References Cited

U.S. PATENT DOCUMENTS

| | | | | |
|---|---|---|---|---|
| 2018/0341860 | A1* | 11/2018 | Shazeer | G06N 3/08 |
| 2019/0130213 | A1* | 5/2019 | Shazeer | G06V 10/56 |
| 2020/0302185 | A1* | 9/2020 | Hussein | G06V 10/426 |
| 2021/0248375 | A1* | 8/2021 | Geng | G06F 16/9035 |
| 2022/0230276 | A1* | 7/2022 | Clark | G06N 3/045 |

OTHER PUBLICATIONS

Parmar et al., "Image Transformer," arXiv (2018) (Year: 2018).*
Wang et al., "Axial-DeepLab: Stand-Alone Axial-Attention for Panoptic Segmentation," arXiv (Mar. 2020 (Year: 2020).*
Parmer et al., "Image Transformer," arXiv (2018) (Year: 2018).*
(Continued)

*Primary Examiner* — Kakali Chaki
*Assistant Examiner* — Kevin L. Smith
(74) *Attorney, Agent, or Firm* — Fish & Richardson P.C.

(57) ABSTRACT

Methods, systems, and apparatus, including computer programs encoded on computer storage media, for processing images using a computer vision neural network that has one or more local self-attention layers. Each local self-attention layer is configured to apply or more local self-attention mechanisms to the layer input to the local self-attention layer.

20 Claims, 4 Drawing Sheets

(56) References Cited

OTHER PUBLICATIONS

Prantl et al., "Tranquil Clouds: Neural Networks for Learning Temporally Coherent Features in Point Clouds," arXiv (Jan. 2020) (Year: 2020).*
Khandelwal et al., "AttentionRNN: A Structured Spatial Attention Mechanism," arXiv (2019) (Year: 2019).*
Bahdanau et al, "Neural machine translation by jointly learning to align and translate.," arXiv, Sep. 1, 2014, 15 pages.
Bello et al, "Attention augmented convolutional networks," Proceedings of the IEEE International Conference on Computer Wsion, Oct. 2019, 10 pages.
Buades et al, "A non-local algorithm for image denoising," 2005 IEEE Computer Society Conference on Computer Vision and Pattern Recognition (CVPR), Jun. 20, 2005, 6 pages.
Chellapilla et al, High performance convolutional neural networks for document processing, HAL Archives-Ouvertes, Nov. 9, 2006, 7 pages.
Chetlur et al, "Cudnn: Efficient primitives for deep learning," arXiv, Oct. 3, 2014, 9 pages.
Child et al, "Generating long sequences with sparse transformers," arXiv, Apr. 23, 2019, 10 pages.
Chollet et al, "Xception: Deep learning with depth wise separable convolutions," Proceedings of the IEEE Conference on Computer Vision and Pattern Recognition, Jul. 2017, 8 pages.
Cubuk et al, "Autoaugment: Learning augmentation strategies from data," Proceedings of the IEEE Conference on Computer Vision and Pattern Recognition, Jun. 2019, 11 pages.
Cubuk et al, "RandAugment: Practical data augmentation with no separate search," arXiv, Sep. 30, 2019, 12 pages.
Girshick, "Fast R-CNN," arXiv, Apr. 30, 2015, 9 pages.
Graves, "Generating sequences with recurrent neural networks.," arXiv, Aug. 4, 2013, 43 pages.
He et al, "Bag of tricks for image classification with convolutional neural networks," Proceedings of the IEEE Conference on Computer Vision and Pattern Recognition, Jun. 2019, 10 pages.
He et al, "Deep residual learning for image recognition," Proceedings of the IEEE Conference on Computer Vision and Pattern Recognition, Jun. 2016, 9 pages.
He et al, "Identity mappings in deep residual networks," European Conference on Computer Vision, arXiv, Jul. 25, 2016, 15 pages.
Howard et al, "Searching for mobilenetv3," Proceedings of the IEEE International Conference on Computer Vision, Oct. 2019, 11 pages.
Hu et al, "Local relation networks for image recognition," Proceedings of the IEEE International Conference on Computer Vision, Oct. 2019, 10 pages.
Hu et al, "Squeeze-and-excitation networks," Proceedings of the IEEE Conference on Computer Vision and Pattern Recognition, Jun. 2018, 10 pages.
Jia et al, "Convolutional architecture for fast feature embedding," Proceedings of the 22nd ACM International Conference on Multimedia, Nov. 2014, 4 pages.
Joffe et al, "Batch normalization: Accelerating deep network training by reducing internal covariate shift," Proceedings of Machine Learning Research (PMLR), 2015, 9 pages.
Jouppi et al, "In-datacenter performance analysis of a tensor processing unit," Proceedings of the 44th Annual International Symposium on Computer Architecture, Jun. 24, 2017, 12 pages.
Krizhevsky et al, "Imagenet classification with deep convolutional neural networks," NeurIPS, 2012, 9 pages.
Lavin et al, "Fast algorithms for convolutional neural networks," Proceedings of the IEEE Conference on Computer Vision and Pattern Recognition, Jun. 2016, 9 pages.
Li et al, "Relation-aware graph attention network for visual question answering," Proceedings of the IEEE International Conference on Computer Vision, Oct. 2019, 10 pages.
Li et al, "Selective kernel networks," Proceedings of the IEEE Conference on Computer Vision and Pattern Recognition, Jun. 2019, 10 pages.
Loshchilov et al, "SGDR: Stochastic gradient descent with warm restarts," International Conference on Leaming Representations, ArXiv, Feb. 23, 2017, 16 pages.
Mathieu et al, "Fast training of convolutional networks through ffts," arXiv, Dec. 20, 2013, 6 pages.
Parmar et al, "Image transformer," International Conference on Machine Leaming, 2018, 10 pages.
Ramachandran et al, Searching for activation functions. arXiv, Oct. 16, 2017, 12 pages.
Ramachandran, "Stand-alone self-attention in vision models," Advances in Neural Information Processing Systems, 2019, 13 pages.
Roy et al, "Efficient content-based sparse attention with routing transformers," arXiv, Oct. 24, 2020, 24 pages.
Russakovsky et al, "Imagenet large scale visual recognition challenge," International Journal of Computer Vision, Apr. 11, 2015, 42 pages.
Shaw et al, "Self-attention with relative position representations," arXiv, Apr. 12, 2018, 5 pages.
Sifre et al, "Rigid-motion scattering for image classification," International Journal of Computer Vision, Mar. 7, 2014, 19 pages.
Srivastava et al, "Dropout: a simple way to prevent neural networks from overfitting," The Journal of Machine Leaming Research, Jun. 2014, 30 pages.
Sutskever et al, "On the importance of initialization and momentum in deep learning," International Conference on Machine Leaming, 2013, 9 pages.
Szegedy et al, "Rethinking the inception architecture for computer vision," Proceedings of the IEEE Conference on Computer Vision and Pattern Recognition, Jun. 2016, 9 pages.
Tan et al, "Efficientnet: Rethinking model scaling for convolutional neural networks," arXiv, May 28, 2019, 10 pages.
Vasilache et al, "Fast convolutional nets with tbfft: A gpu performance evaluation," arXiv, Dec. 24, 2014, 16 pages.
Vaswani et al, "Attention is all you need. In Advances in neural information processing systems," 2017, 11 pages.
Wang et al, "Axialdeeplab: Stand-alone axial-attention for panoptic segmentation," arXiv, Aug. 6, 2020, 26 pages.
Wang et al, "Non-local neural networks," Proceedings of the IEEE Conference on Computer Vision and Pattern Recognition, Jun. 2018, 10 pages.
Xie et al, "Aggregated residual transformations for deep neural networks," Proceedings of the IEEE Conference on Computer Vision and Pattern Recognition, Jul. 2017, 9 pages.
Xu et al, "Show, attend and tell: Neural image caption generation with visual attention," International conference on machine Leaming, 2015, 10 pages.
Yang et al, "Modeling point clouds with self-attention and gumbel subset sampling," Proceedings of the IEEE Conference on Computer Vision and Pattern Recognition, Jun. 2019, 10 pages.
Zhao et al, "Exploring self-attention for image recognition," Proceedings of the IEEE Conference on Computer Vision and Pattern Recognition, Jun. 2016, 10 pages.
Zoph et al, "Leaming transferable architectures for scalable image recognition," Proceedings of the IEEE Conference on Computer Vision and Pattern Recognition, Jun. 2018, 14 pages.

* cited by examiner

LOCAL SELF-ATTENTION COMPUTER VISION NEURAL NETWORKS

CROSS-REFERENCE TO RELATED APPLICATION

This application claims priority to U.S. Provisional Application No. 63/038,718, filed on Jun. 12, 2020. The disclosure of the prior application is considered part of and is incorporated by reference in the disclosure of this application.

BACKGROUND

This specification relates to processing an image using a computer vision neural network to generate a network output for a computer vision task.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that processes an input image using a computer vision neural network to generate an output for a computer vision task. The computer vision neural network includes one or more local self-attention vision neural network layers that each apply a local self-attention mechanism to input blocks generated from the layer input to the self-attention vision neural network layer.

Particular embodiments of the subject matter described in this specification can be implemented so as to realize one or more of the following advantages.

Using techniques described in this specification, a system can implement the operations of a neural network that includes local self-attention layers in a time and memory efficient manner. Some existing techniques for implementing the operations of local self-attention layers are not parallelizable on modern processing units, e.g., deep neural network hardware accelerators such as tensor processing units (TPUs) or graphics processing units (GPUs), which leads to poor performance and long runtime. By grouping the elements of the layer inputs of local self-attention layers into query blocks and processing each query block in parallel, systems described in this specification are able to parallelize the operations of the local self-attention layers and significantly reduce the time and memory required to both train the neural network and perform inference using the neural networks. This can allow the systems to implement neural networks that are more complex and have many more parameters than was previously feasible given the time required to train the networks. Moreover, by using the entire context block to generate the keys and values for each element of the corresponding query block instead of attempting to maintain spatial invariance through masking different context block elements for different query block elements, the system avoids wasting computation, i.e., performing multiplies between masked out values and non-masked values, and, in fact, generates more accurate outputs for a given computer vision task than an otherwise equivalent system that uses masking to maintain spatial invariance within the local self-attention mechanism.

Some existing techniques implement the operations of convolutional neural network layers in a highly efficient manner on deep neural network accelerators. However, existing techniques for implementing local self-attention layers are unable to utilize these existing optimizations. By performing local self-attention using convolutions as described in this specification, a system can optimize the implementation of the local self-attention layers by utilizing the accelerator hardware that is already optimized for performing convolutions.

Using techniques described in this specification, i.e., by implementing local self-attention layers as described in this specification, a system can train neural networks with local self-attention layers that have as many parameters as existing convolutional neural networks using a comparable amount of time and memory. The neural networks with self-attention layers perform as well or better than existing convolutional neural networks of the same size on image processing tasks, e.g., image classification.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
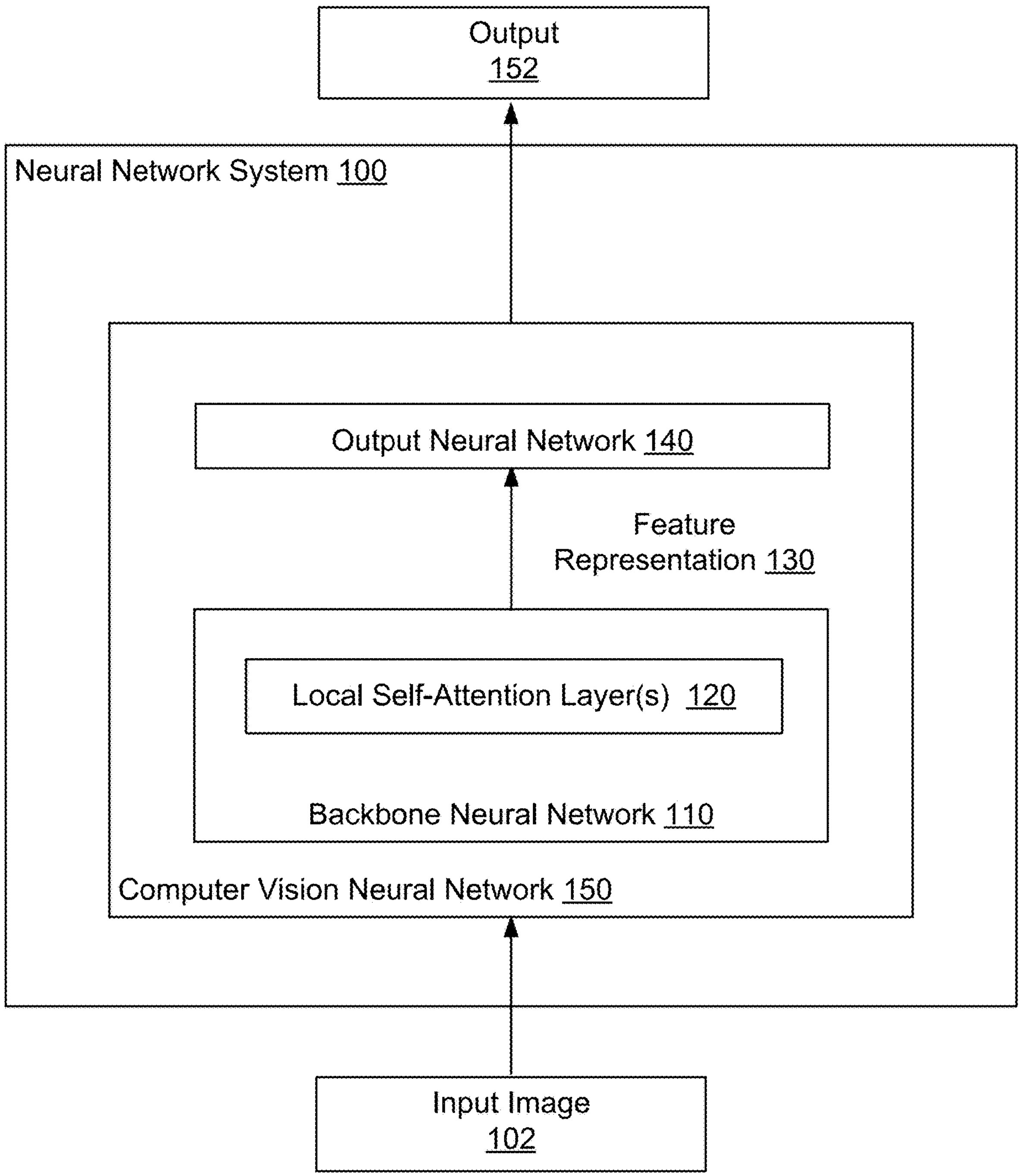
FIG. 1 shows an example neural network system.

FIG. 1 shows an example neural network system 100. The neural network system 100 is an example of a system implemented as computer programs on one or more computers in one or more locations, in which the systems, components, and techniques described below can be implemented.

The neural network system 100 can receive an input image 102 and perform a computer vision task on the input image 102 to generate an output 152 for the computer vision task.

That is, the system 100 can process the input image 102 using a computer vision neural network 150 that is configured to process an input that includes an image to generate a corresponding output, e.g., a classification output, a regression output, or a combination thereof, for the computer vision task.

As a particular example, the neural network 150 can be configured to process an image to generate a classification output that includes a respective score corresponding to each of multiple categories. The score for a category indicates a likelihood that the image belongs to the category. In some cases, the categories may be classes of objects (e.g., dog, cat, person, and the like), and the image may belong to a category if it depicts an object included in the object class corresponding to the category. In some cases, the categories may represent global image properties (e.g., whether the image depicts a scene in the day or at night, or whether the image depicts a scene in the summer or the winter), and the image may belong to the category if it has the global property corresponding to the category.

As another particular example, the neural network 150 can be configured to process an image to generate a pixel-level classification output that includes, for each pixel, a respective score corresponding to each of multiple categories. For a given pixel, the score for a category indicates a likelihood that pixel belongs to the category. In some cases, the categories may be classes of objects, and a pixel may belong to a category if it is part on an object included in the object class corresponding to the category. That is, the pixel-level classification output may be a semantic segmentation output.

As another particular example, the neural network 150 can be configured to process an image to generate a regression output that estimates one or more continuous variables (i.e., that can assume infinitely many possible numerical values) that characterize the image. In a particular example, the regression output may estimate the coordinates of bounding boxes that enclose respective objects depicted in the image. The coordinates of a bounding box may be defined by (x, y) coordinates of the vertices of the bounding box.

The computer vision neural network 150 includes multiple neural network layers, at least one of which is a local self-attention layer 120.

In particular, the computer vision neural network 150 includes a backbone neural network 110 that processes the input image 102 to generate a feature representation 130 of the input image 102 and an output neural network 140 that processes the feature representation 130 to generate the output 152 for the computer vision task. The feature representation can be, e.g., one or more tensor of numeric values that represent learned properties of the input image 102. For example, the feature representation 130 can be a single feature map having smaller spatial dimensions than the input image but with a larger number of channels than the input image. As another example, the feature representation 130 can be a multi-scale representation that includes multiple different feature maps with different spatial dimensions.

The backbone neural network 110 can have any appropriate architecture that includes one or more local self-attention layers 120. For example, the backbone neural network 110 can have an architecture that replaces some or all of the spatial convolutional layers with a corresponding local self-attention layer 120.

As a particular example, the backbone neural network 110 can include multiple residual blocks (also referred to as "layer stacks") that are each configured to receive a stack input and to generate a stack output. Each block can include a first convolutional neural network layer that reduces a dimensionality of the stack input, a local self-attention layer that operates on the reduced-dimensionality stack input, and a second convolutional neural network layer that increases the dimensionality of the output of the local self-attention layer. Each layer stack can also include a shortcut ("residual") connection between the stack input and the stack output.

Similarly, the output neural network 140 can have any appropriate architecture that allows the output neural network 140 to map the feature representation 130 to an appropriate output for the computer vision task. For example, the output neural network 140 can include one or more of: local self-attention layers, global self-attention layers, convolutional layers, or fully-connected layers.

Some example architectures for the computer vision neural network 150 are described in more detail below.

More generally, although one local self-attention layer 120 is depicted in FIG. 1 for convenience, as described above, the computer vision neural network 150 generally includes many other layers, including other local self-attention layers 120 and other types of neural network layers.

In some cases, the local self-attention layer 120 includes a single attention head, i.e., applies a local self-attention mechanism to the layer input to generate the layer output. In some other cases, the layer 120 includes multiple heads and each of the multiple attention heads applies a respective local self-attention mechanism over the layer input in parallel to generate a respective attention output. The attention layer 120 then combines the outputs of the multiple attention heads, e.g., by concatenating the outputs, summing the outputs, or averaging the outputs, to generate the final layer output for the attention layer 120.

Generally, the attention mechanism(s) applied by the local self-attention layer 120 are referred to as "local" attention mechanism because the layer input to the layer 120 is divided into query blocks, with all of the elements within a given query block sharing a corresponding context block, and the layer 120 applies attention in parallel for each query block-context block pair. Applying a local self-attention mechanism will be described in more detail below with reference to FIGS. 2-4.

As used in this specification, the term "learned" means that an operation or a value has been adjusted during the training of the computer vision neural network 150.

Figure 2:
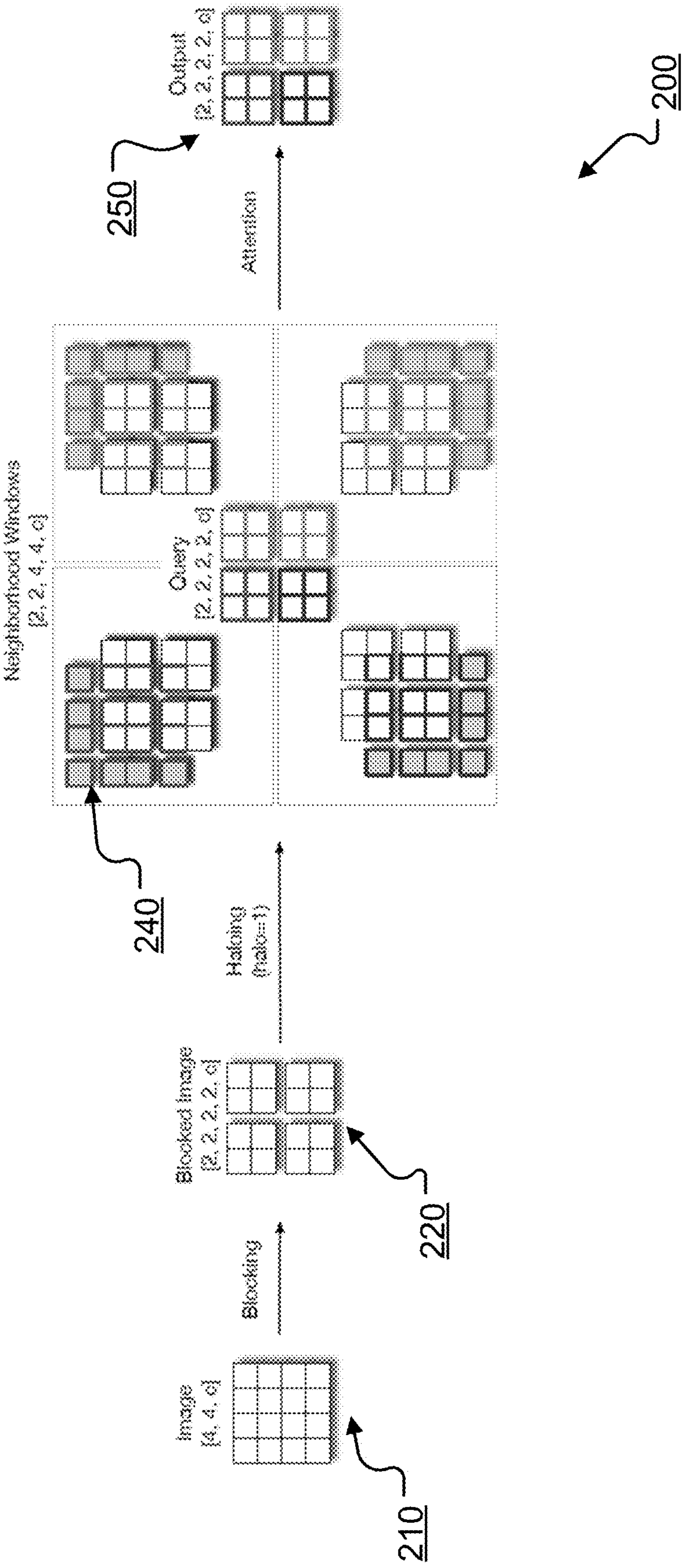
FIG. 2 is an illustration of a local self-attention mechanism being applied by a local self-attention layer.

FIG. 2 is an illustration 200 of a local self-attention mechanism being applied to a layer input 210 by a local self-attention layer.

As described above, when the local self-attention layer has only a single attention head, the layer can use the output of the local self-attention mechanism as the output of the layer. If the layer has multiple attention heads, the layer can combine the respective outputs of the respective local self-attention mechanisms of the multiple attention heads to generate the output for the layer.

The layer input 210 includes a height, width, and channel dimension, similar to an image. In the example of FIG. 2 the layer input 210 is a [4, 4, c] "image", where [4, 4] represents the height and width dimensions and c represents the channel dimension. While the spatial dimensions are relatively small, i.e., with a width and a height both equal to 4, in the example of FIG. 2 for ease of illustration, the layer input 210 can have much larger spatial dimensions in practice.

While FIG. 2 shows the layer input 210 being a single "image," i.e., a single tensor generated from a single input image, in some implementations, each layer input includes a "batch" dimension, where the neural network processes a batch of multiple input images in parallel and the layer input 210 includes a respective index along the batch dimension for each input image in the batch.

In order to streamline the computations of the self-attention outputs, each local self-attention layer can group the elements of the corresponding layer input into multiple groups called "query blocks." An element of a layer input, as used in this specification, is the vector of values at one of the spatial locations in the layer input, i.e., a vector in which all of the values have the same height and width index but different channel indices. In other words, a given element includes all of the values along the channel dimension at a given spatial location.

In particular, the local self-attention layer can group the elements into different query blocks in the (height, width) domains. That is, for each element corresponding to a particular height index and a particular width index, the local self-attention layer can assign the element to a particular query block.

In other words, the blocking performed by the layer divides the block input 210 into (H/b×W/b) non-overlapping (b, b, c) blocks, where b is a block size value for the layer.

In the example of FIG. 2, b is equal to 2 and the system has divided the input 210 into a "blocked" image that includes four 2 element by 2 element query blocks 220.

For each query block 220, the local self-attention layer determines a corresponding context block 240 that includes the elements that will be attended over to generate the outputs for the elements in the query block 220.

The context block 240 for a given query block 220 includes the elements in the query block 220 and multiple surrounding elements in the layer input that correspond to a local window of elements around the query block 220. More specifically, for a given query block 220, the context block 240 is a (b+2h, b+2h, c) portion of the layer input 210 that is centered at the center of the given query block 220 in the layer input, where h is a halo value for the local self-attention layer. Thus, the size of each context block 240 is determined by the halo value h for the local self-attention layer.

To ensure that all of the context blocks 240 are the same size, the local self-attention layer can pad the boundaries of the layer input 210, e.g., with zeroes, e.g., by adding h rows to the top and bottom of the layer input 210 and h columns to the left and right of the layer input 210. The shaded blocks in FIG. 2 are examples of padding that has been added to the boundaries of the layer input 210.

In the example of FIG. 2, the halo value h is equal to 1, and the system therefore generates a respective (4, 4, c) context block 240 for each query block 220.

After determining the context block 240 corresponding to each query block 220, the local self-attention layer can process each query block-context block pair in parallel to generate the self-attention layer output. In particular, given a query block 220 and the corresponding context block 240, the local self-attention layer can generate a block attention output 250 for the given query block 220 that includes a respective attention output for each element in the query block 220. Because the attention is "local" within the query block, the layer can generate the block attention outputs 250 for all of the query blocks 220 in parallel.

In particular, for each element in a given query block 220, the local self-attention layer can determine a query from the value of the element, determine keys from the elements in the context block, and determine values from the elements in the context block. For example, for each element (i,j) in the query block, the local self-attention layer can determine:

$$\text{query } q_{ij} = W_Q x_{ij}$$

$$\text{keys } k_{ab} = W_K x_{ab}$$

$$\text{values } v_{ab} = W_V x_{ab}$$

where (a,b) is an element in the context block of the given query block, and $W_Q$, $W_K$, and $W_V$ represent learned linear transformations of the pixel values that are shared among all of the query and context blocks for the attention mechanism.

Then, for each element, the local self-attention layer can generate the corresponding attention output by combining the corresponding query, keys, and values. For example, the local self-attention layer can compute $$y_{ij} = \sum_{a,b \in N(i,j)} softmax_{ab}\left(q_{ij}^T k_{ab} + q_{ij}^T r_{a-i,b-j}\right) v_{ab}$$

where N(i,j) is the context block for the given query block and $r_{a-i,b-j}$ is a learned relative position-based embedding. That is, the $$q_{ij}^T k_{ab}$$

component can capture content-to-content interactions between the query element and the neighboring element, while the $$q_{ij}^T r_{a-i,b-j}$$

can capture the interaction between the query element and the relative position of the neighboring element.

Thus, when determining the keys and values corresponding to a particular element of a query block and computing the attention outputs, the local self-attention layer does not mask any elements and all elements in the query block have the same sets of keys and values.

In particular, some techniques apply attention for each element of a query block so that only the elements that are in a local window of the particular element are attended over. This is done by masking out elements that are not in the local window when computing the keys and values, i.e., so that the value of the expression inside the sum is zero if (a, b) is in the context block but not within the local window of the element (i, j). However, in these cases, the system would still perform the dot-product computation between queries and neighboring pixels that are masked. Therefore, in order not to "waste" this computation, the local self-attention layer provides the entire context to the query when determining the attention output of the particular element, i.e., by not masking out the elements of the context block that are not in the local window of the particular element.

In some implementations, the neural network parallelizes the processing of each query block in each local self-attention layer by enforcing that the layer inputs and outputs always maintain the query block format. For example, each layer input and output can be five-dimensional, with dimensions corresponding to height, width, channel, batch, and query blocks. That is, the neural network groups the elements by query block and stacks the query blocks in the layer inputs and outputs. As a particular example, the system can flatten each (b,b) block into a sequence of $b^2$ elements and process the image through the layers of the neural network as a five-dimensional tensor: (Batch, H/b, W/b, $b^2$, c). Therefore, the neural network does not have to perform reshape operations at every layer, which can be computationally expensive on deep neural network accelerators, e.g., TPUs.

In some implementations, the local self-attention layer determines the context blocks 240 corresponding to each query block 220 by processing the layer input using twodimensional or three-dimensional convolutions. That is, the local self-attention layer generates the tensor that includes all of the context blocks 240 for all of the query blocks 220 by processing the layer input using a convolution instead of, e.g., performing gathering operations like slices and concatenations. Because convolutions can be efficiently implemented in hardware, e.g., on TPUs or GPUs, this allows the layer to generate the tensor more quickly than it could otherwise.

For example, the local self-attention layer can process the layer input to generate a given context block by performing convolution using a kernel that includes a '1' at each location corresponding to an element in the given context block. In some implementations, the kernel is the same size as the context block. In some implementations, the kernel has more elements than the context block, and each location that does not correspond to an element in the context block is a '0'. That is, the kernel can be a sparse kernel have non-zero values corresponding to each element in the context block, and zero values at all other locations. As another example, the kernel can include a '1' at each location corresponding to an element in the local window of an element of the layer input. In some implementations, the kernel can be the same size as the local window. In some implementations, the kernel has more elements than the local window, and each location that does not correspond to an element in the local window is a '0'. That is, the kernel can be a sparse kernel have non-zero values corresponding to each element in the local window, and zero values at all other locations. As another example, the kernel can be a one-hot kernel, i.e., a kernel that has all '0' values except for a single '1' value.

As a particular example, when the system maintains the layer input as a 5d tensor, the system can apply a three-dimensional convolution that has a kernel that is made up of ones and zeros as described above and that has size [3, 3, $b^2$, $(b+2h)^2$] to generate the respective context block for each of the layer blocks for each network input in the batch.

As can be seen from the example of FIG. 2, the operations performed by the local self-attention layer preserve the spatial dimensions, i.e., the height and width, of the layer input. In some implementations, the neural network also includes an attention downsampling layer that reduce the spatial dimension of layer input, i.e., that "downsample" the layer input. For example, the attention downsampling layer can be included in the backbone neural network in place of a convolutional layer that performs a convolution with a stride greater than one, a pooling layer, or both.

Figure 3:
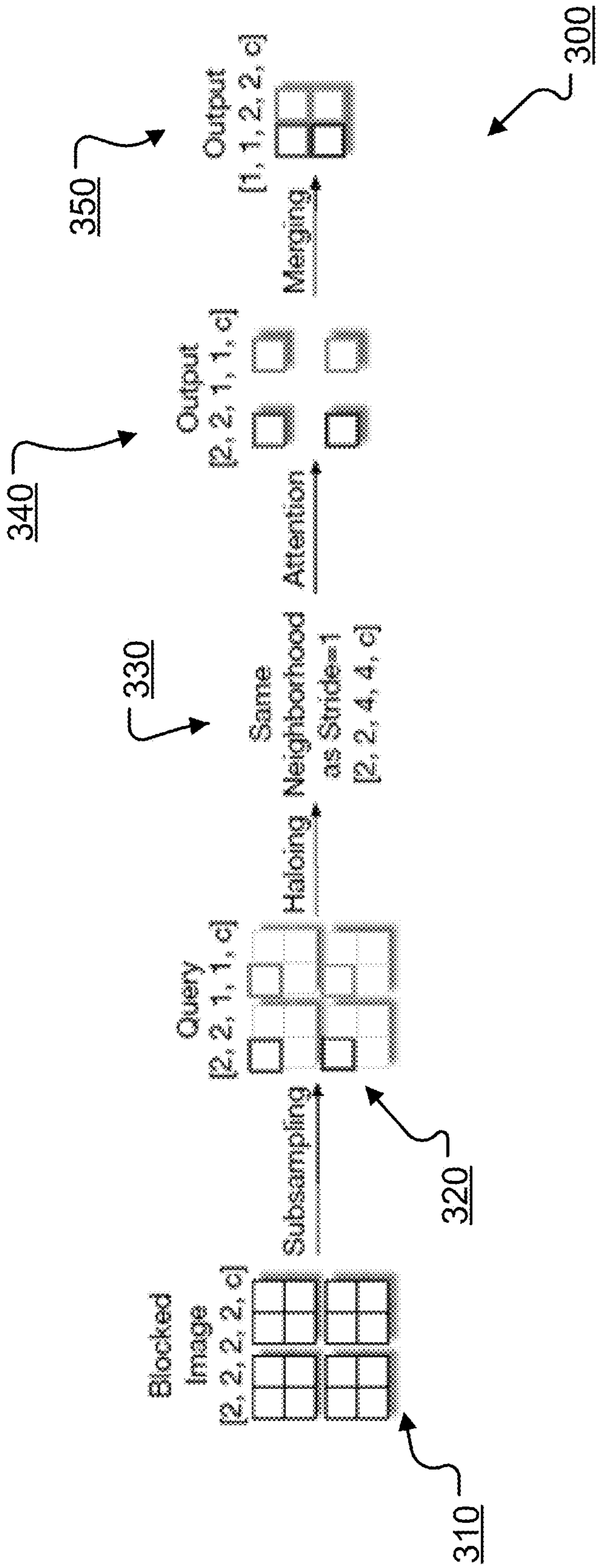
FIG. 3 is an illustration 300 of a downsampling local self-attention scheme applied by an attention downsampling layer.

FIG. 3 is an illustration 300 of a downsampling local self-attention mechanism applied by an attention downsampling layer.

Like a local-self attention layer, the attention downsampling layer receives a layer input 310 that includes a height, width, and channel dimension, similar to an image. In the example of FIG. 3 the layer input 310 is also a [4, 4, c] "image."

Like a local-self attention layer, the attention downsampling layer also groups the layer input into query blocks 320. However, unlike the query blocks 220 generated by the local-self attention layer, in which each element of the layer input 210 was assigned to one query block 220, the attention downsampling layer sub-samples the query blocks so that only a proper subset of the elements in the input 310 are assigned to a query block 320.

In particular, given a block size b, the attention downsampling layer generates a respective query block 320 corresponding to each of the H/b×W/b non-overlapping (b, b, c) blocks by selecting a proper subset of the (b, b) spatial locations in the (b, b, c) block as the query block 320. The size of the proper subset relative to the b×b spatial locations in the (b, b, c) block is determined by a downsampling factor for the attention downsampling layer. In the example of FIG. 3, the downsampling factor is two, and the attention downsampling layer selects one of the four elements in each of the blocks, i.e., the element in the top left corner of each (2, 2, c) block. That is, in the example of FIG. 3, the respective query blocks 320 are each a (1, 1, c) block.

The attention downsampling layer then determines a corresponding context block 330 for each query block 320. In particular, the attention downsampling layer determines a respective context block 330 for each of the H/b×W/b non-overlapping (b, b, c) blocks as described above with reference to FIG. 2 and then uses the respective context block 330 as the context block for query block 320 corresponding to the (b, b, c) block. That is, even though the attention downsampling layer applied sub-sampling when generating the query blocks 320, the layer generates the context blocks 330 the same way as would be generated if the query blocks 320 had been generated with no sub-sampling. Thus, elements in the layer input 310 that are not included in any query blocks are still included in the attention mechanism because each element in the layer input 310 is included in at least one context block The attention downsampling layer then processes each query block 320 in parallel to generate a respective attention output 340 for each element in each of the query blocks. In particular, the layer can apply attention as described above with reference to FIG. 2 within each query block-context block pair to generate the attention outputs 340.

The layer then merges the attention outputs 340 to generate a down-sampled output 350 that has spatial dimensions H/s×H/s, where s is the stride value for the layer.

As described above, the computer vision neural network can have any appropriate architecture that includes one or more local self-attention layers and that is arranged to map an image to an appropriate output for a corresponding computer vision task.

One example architecture for a classification task is shown in Table 1.

TABLE 1

| Output Resolution | Layers |
|---|---|
| $\frac{s}{4}\times\frac{s}{4}$ | 7 × 7 conv stride 2, 64<br>3 × 3 max pool stride 2 |
| $\frac{s}{4}\times\frac{s}{4}$ | $\left\{\begin{matrix}1\times1,\ 64\\ \text{attention }(b,h),\ 64\cdot r_v\\ 1\times1,\ 64\cdot r_b\end{matrix}\right\}\times3$ |
| $\frac{s}{8}\times\frac{s}{8}$ | $\left\{\begin{matrix}1\times1,\ 128\\ \text{attention }(b,h),\ 128\cdot r_v\\ 1\times1,\ 128\cdot r_b\end{matrix}\right\}\times3$ |
| $\frac{s}{16}\times\frac{s}{16}$ | $\left\{\begin{matrix}1\times1,\ 256\\ \text{attention }(b,h),\ 256\cdot r_v\\ 1\times1,\ 256\cdot r_b\end{matrix}\right\}\times l_3$ |
| $\frac{s}{32}\times\frac{s}{32}$ | $\left\{\begin{matrix}1\times1,\ 512\\ \text{attention }(b,h),\ 512\cdot r_v\\ 1\times1,\ 512\cdot r_b\end{matrix}\right\}\times3$ |

TABLE 1-continued

| Output Resolution | Layers |
|---|---|
| $\frac{s}{32} \times \frac{s}{32}$ | 1 × 1, $d_f$ |
| 1 × 1 | global average pooling<br>fc, 1000 |

As shown in Table 1, the neural network maps an input image of size s×s to an output that includes a respective score for each of 1000 categories. The architecture includes a backbone neural network that includes (i) an initial layer block that includes a 7×7 convolution with stride 2 and a 3×3 max pooling layer with stride 2, and (ii) four local self-attention layer blocks that each reduce the spatial resolution of the each include multiple sets of local self-attention layers that are each preceded and followed by a 1×1 convolution. The second, third, and fourth self-attention layer blocks each reduce the spatial resolution of the input to the block, e.g., by having an attention downsampling layer as the first local self-attention layer in the block. The neural network also includes an output neural network that generates the output for the task (the scores for the 1000 categories) from the output of the last self-attention layer block and that includes a 1×1 convolution layer, a global average pooling layer, and a fully-connected layer. The values of the variables $r_v$, $r_b$, $l_3$, $d_f$ can be set to control the computational efficiency of the neural network.

As another example, for object detection, the output neural network can be a Mask R-CNN output head, as described in, Kaiming He, Georgia Gkioxari, Piotr Dollár, and Ross Girshick. Mask r-cnn. In ICCV, 2017, while the backbone neural network can be a ResNet-based backbone with one or more of the convolutional layers replaced with local self-attention layers. For example, the backbone can be a ResNet-50 or a ResNet-101 backbone with the last two, three, or four, convolutional layers replaced with local self-attention layers.

Figure 4:
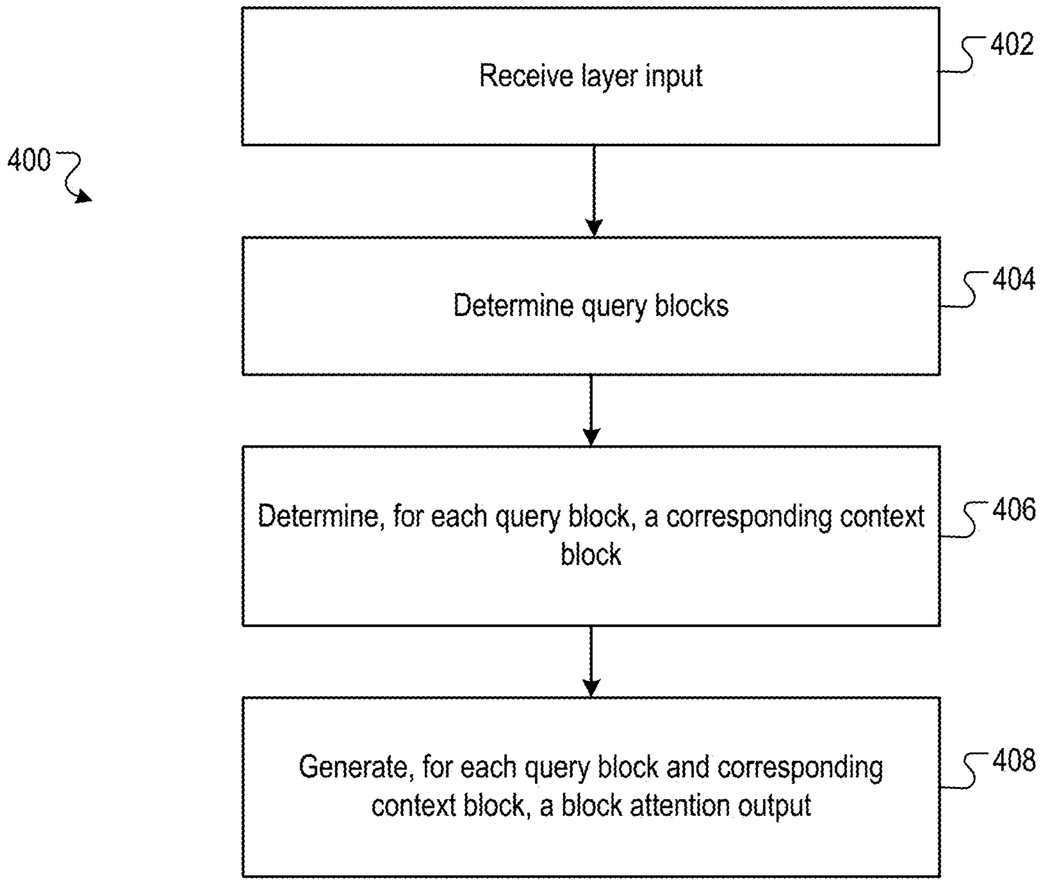
FIG. 4 is a flow diagram of an example process for applying a local self-attention mechanism.

FIG. 4 is a flow diagram of an example process 400 for applying a local self-attention mechanism. For convenience, the process 400 will be described as being performed by a system of one or more computers located in one or more locations. For example, a neural network system, e.g., neural network system 100 of FIG. 1, appropriately programmed in accordance with this specification, can perform the process 400.

The process 400 can be performed by each local self-attention layer to generate a respective output for each attention head of the local self-attention layer. If the layer has only a single attention head, the layer can use the output for the single attention head as the output of the layer. If the layer has multiple attention heads, the layer can combine the respective outputs of the multiple attention heads to generate the output for the layer.

The system receives a layer input for the local self-attention layer (step 402).

The system determines a plurality of query blocks (step 404). Each query block includes a plurality of neighboring elements of the layer input. In particular, the query blocks are (b, b, c) non-overlapping partitions of spatial dimensions of the layer input.

The system determines, for each query block, a corresponding context block (step 406). The context block for a given query block includes the elements in the given query block and a plurality of elements of the layer input in a local window surrounding the given query block.

The system generates, for each query block and corresponding context block, a block attention output (step 408). In particular, for a given query block, the system determines a respective query for each element in the query block, a respective key for each element in the corresponding context block for the given query block, and a respective value for each element of the corresponding context block for the given query block. The system then uses the determined query, keys, and values to generate the block attention output that includes a respective attention output for each element of the query block.

The process 400 can be performed as part of predicting an output for an input for which the desired output, i.e., the output that should be generated by the system for the input image, is not known.

The process 400 can also be performed as part of processing inputs derived from a set of training data, i.e., inputs derived from a set of inputs for which the output that should be generated by the system is known, in order to train the computer vision neural network to determine trained values for the parameters of the computer vision neural network. The system can repeatedly perform the process 400 on inputs selected from a set of training data as part of a conventional machine learning training technique to train the attention layers and the output layer(s) of the neural network, e.g., a gradient descent with backpropagation training technique that uses a conventional optimizer, e.g., stochastic gradient descent, RMSprop, or Adam optimizer, to optimize an objective function that is appropriate for the computer vision task that the computer vision neural network is configured to perform. During training, the system can incorporate any number of techniques to improve the speed, the effectiveness, or both of the training process. For example, the system can use dropout, label smoothing, or both to reduce overfitting. As another example, the system can perform the training using a distributed architecture that trains multiple instances of the computer vision neural network in parallel. Moreover, the system can first pre-train the neural network on a large unsupervised or weakly supervised data set through unsupervised learning, e.g., to minimize an unsupervised or a weakly supervised loss, and then fine-tune the computer vision neural network on task-specific training data to optimize the objective function for the computer vision task.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system for processing an image with parallel processing, comprising:

one or more computers; and one or more storage devices storing instructions that when executed by the one or more computers cause the one or more computers to implement a computer vision neural network comprising a backbone neural network having one or more local self-attention layers and configured to process the image to generate a feature representation of the image and an output neural network configured to process the image to generate an output for a computer vision task from the feature representation of the image, wherein each local self-attention layer is configured to apply a local self-attention mechanism to a layer input representing the image and to generate a self-attention layer output, wherein applying the local self-attention mechanism to generate the self-attention layer output comprises:

determining, by the local self-attention layer, a plurality of query blocks, wherein each query block is a respective non-overlapping subset of elements of the layer input that represents the image and comprises a respective plurality of neighboring elements of the layer input;

determining, by the local self-attention layer, a plurality of context blocks, each context block corresponding to a respective query block, wherein each context block comprises elements in a corresponding query block and a plurality of elements of the layer input in a local window surrounding the corresponding query block within the layer input that represents the image, and wherein the local self-attention layer pads boundaries of the layer input such that the plurality of context blocks are of a same size, the size of each of the plurality of context blocks being determined by a halo value of the local self-attention layer; and generating, by the local self-attention layer, in parallel across the plurality of query blocks that are each a respective non-overlapping subset of the elements of the layer input, a respective block attention output for each query block, comprising:

determining a respective query for each element in the query block based on applying a first learned linear transformation to the element, determining a respective key for each element of the corresponding context block based on applying a second learned linear transformation to each element of the corresponding context block, determining a respective value for each element of the corresponding context block based on applying a third learned linear transformation to each element of the corresponding context block, and using the determined query, keys, and values to generate a respective attention output for each element of the query block.

2. The system of claim 1, wherein determining, for each query block, a corresponding context block comprises processing the layer input using a convolution.

3. The system of claim 2, wherein determining, for each query block, a corresponding context block comprises processing the layer input using a three-dimensional convolution.

4. The system of claim 1, wherein generating a block attention output for each query block in parallel comprises processing, for each local self-attention layer of the neural network, a five-dimensional layer input, wherein each layer input includes:

a dimension corresponding to a height of the layer input, a dimension corresponding to a width of the layer input, a dimension corresponding to a number of channels in the layer input, a dimension corresponding to a number of layer inputs in a batch of layer inputs for the local self-attention layer, and a dimension corresponding to a number of elements in each query block of the layer input.

5. The system of claim 1, wherein the neural network comprises one or more attention downsampling layers that each subsample queries according to a stride value.

6. The system of claim 1, wherein determining keys and values corresponding to an element of a query block comprises determining the keys and values using an entire corresponding context block without masking.

7. The system of claim 1, wherein the neural network is configured process a network input comprising an input image and to generate a network output comprising one or more of:

a predicted classification of the input image, a semantic segmentation of the input image, or an object detection output comprising a respective predicted location in the input image of one or more detected objects.

8. The system of claim 1, wherein the neural network comprises a plurality of layer stacks, wherein each layer stacks is configured to receive a stack input and to generate a stack output, and wherein each layer stack comprises:

a first convolutional neural network layer that reduces a dimensionality of the stack input;

a local self-attention layer; and a second convolutional neural network layer that increases the dimensionality of an output of the local self-attention layer.

9. The system of claim 8, wherein each layer stack further comprises a shortcut connection between the stack input and the stack output.

10. One or more non-transitory computer-readable storage media storing instructions that when executed by one or more computers cause the one or more computers to implement a computer vision neural network comprising a backbone neural network having one or more local self-attention layers and configured to process an image to generate a feature representation of the image and an output neural network configured to process the image to generate an output for a computer vision task from the feature representation of the image, wherein each local self-attention layer is configured to apply a local self-attention mechanism to a layer input representing the image and to generate a self-attention layer output, wherein applying the local self-attention mechanism to generate the self-attention layer output comprises:

determining, by the local self-attention layer, a plurality of query blocks, wherein each query block is a respective non-overlapping subset of elements of the layer input that represents the image and comprises a respective plurality of neighboring elements of the layer input;

determining, by the local self-attention layer, a plurality of context blocks, each context block corresponding to a respective query block, wherein each context block comprises elements in a corresponding query block and a plurality of elements of the layer input in a local window surrounding the corresponding query block within the layer input that represents the image, and wherein the local self-attention layer pads boundaries of the layer input such that the plurality of context blocks are of a same size, the size of each of the plurality of context blocks being determined by a halo value of the local self-attention layer; and generating, by the local self-attention layer, in parallel across the plurality of query blocks that are each a respective non-overlapping subset of the elements of the layer input, a respective block attention output for each query block, comprising:

determining a respective query for each element in the query block based on applying a first learned linear transformation to the element, determining a respective key for each element of the corresponding context block based on applying a second learned linear transformation to each element of the corresponding context block, determining a respective value for each element of the corresponding context block based on applying a third learned linear transformation to each element of the corresponding context block, and using the determined query, keys, and values to generate a respective attention output for each element of the query block.

11. A method performed by one or more computers, the method comprising:

receiving an input image; and processing the input image using a computer vision neural network comprising a backbone neural network having one or more local self-attention layers and configured to process the input image to generate a feature representation of the input image and an output neural network configured to process the input image to generate an output for a computer vision task from the feature representation of the input image, wherein each local self-attention layer is configured to apply a local self-attention mechanism to a layer input representing the input image and to generate a self-attention layer output, wherein applying the local self-attention mechanism to generate the self-attention layer output comprises:

determining, by the local self-attention layer, a plurality of query blocks, wherein each query block is a respective non-overlapping subset of elements of the layer input that represents the input image and comprises a respective plurality of neighboring elements of the layer input;

determining, by the local self-attention layer, a plurality of context blocks, each context block corresponding to a respective query block, wherein each context block comprises elements in a corresponding query block and a plurality of elements of the layer input in a local window surrounding the corresponding query block within the layer input that represents the input image, and wherein the local self-attention layer pads boundaries of the layer input such that the plurality of context blocks are of a same size, the size of each of the plurality of context blocks being determined by a halo value of the local self-attention layer; and generating, by the local self-attention layer, in parallel across the plurality of query blocks that are each a respective non-overlapping subset of the elements of the layer input, a respective block attention output for each query block, comprising:

determining a respective query for each element in the query block based on applying a first learned linear transformation to the element, determining a respective key for each element of the corresponding context block based on applying a second learned linear transformation to each element of the corresponding context block, determining a respective value for each element of the corresponding context block based on applying a third learned linear transformation to each element of the corresponding context block, and using the determined query, keys, and values to generate a respective attention output for each element of the query block.

12. The method of claim 11, wherein determining, for each query block, a corresponding context block comprises processing the layer input using a convolution.

13. The method of claim 12, wherein determining, for each query block, a corresponding context block comprises processing the layer input using a three-dimensional convolution.

14. The method of claim 11, wherein generating a block attention output for each query block in parallel comprises processing, for each local self-attention layer of the neural network, a five-dimensional layer input, wherein each layer input includes:

a dimension corresponding to a height of the layer input, a dimension corresponding to a width of the layer input, a dimension corresponding to a number of channels in the layer input, a dimension corresponding to a number of layer inputs in a batch of layer inputs for the local self-attention layer, and a dimension corresponding to a number of elements in each query block of the layer input.

15. The method of claim 11, wherein the neural network comprises one or more attention downsampling layers that each subsample queries according to a stride value.

16. The method of claim 11, wherein determining keys and values corresponding to an element of a query block comprises determining the keys and values using an entire corresponding context block without masking.

17. The method of claim 11, wherein the output for the computer vision task is one or more of:

a predicted classification of the input image, a semantic segmentation of the input image, or an object detection output comprising a respective predicted location in the input image of one or more detected objects.

18. The method of claim 11, wherein the neural network comprises a plurality of layer stacks, wherein each layer stacks is configured to receive a stack input and to generate a stack output, and wherein each layer stack comprises:

a first convolutional neural network layer that reduces a dimensionality of the stack input;

a local self-attention layer; and a second convolutional neural network layer that increases the dimensionality of an output of the local self-attention layer.

19. The method of claim 18, wherein each layer stack further comprises a shortcut connection between the stack input and the stack output.

20. The one or more non-transitory computer-readable storage media of claim 10, wherein determining, for each query block, a corresponding context block comprises processing the layer input using a convolution.

* * * * *